US009504976B2

United States Patent
Stander et al.

(10) Patent No.: US 9,504,976 B2
(45) Date of Patent: Nov. 29, 2016

(54) PROCESS FOR LOADING PARTICULATE MATERIAL INTO A NARROW VERTICAL CONTAINER

(71) Applicant: PETROVAL, Saint Romain de Colbosc (FR)

(72) Inventors: Adriaan Stander, Fontenay (FR);
Giuseppe Galassini, Le Havre (FR);
Olivier Girard, Fourmetot (FR);
Nicolas Aubin, Saint Laurent de Brevedent (FR)

(73) Assignee: PETROVAL, Saint Romain de Colbosc (FR)

( * ) Notice: Subject to any disclaimer, the term of this patent is extended or adjusted under 35 U.S.C. 154(b) by 225 days.

(21) Appl. No.: 14/521,621

(22) Filed: Oct. 23, 2014

(65) Prior Publication Data

US 2015/0122372 A1      May 7, 2015

(30) Foreign Application Priority Data

Nov. 4, 2013   (EP) .................................... 13306506

(51) Int. Cl.
*B65B 1/04*     (2006.01)
*B01J 8/00*     (2006.01)
*B65G 69/16*    (2006.01)

(52) U.S. Cl.
CPC .............. *B01J 8/0025* (2013.01); *B01J 8/003* (2013.01); *B65G 69/16* (2013.01); *B01J 2208/00752* (2013.01); *B01J 2208/00769* (2013.01)

(58) Field of Classification Search
CPC ........ B01J 8/0025; B01J 8/002; B01J 8/003; B01J 2208/00752; B01J 2208/00778; B01J 2208/00769; B01J 2208/00884
See application file for complete search history.

(56) References Cited

U.S. PATENT DOCUMENTS 4,051,019 A    9/1977   Johnson

FOREIGN PATENT DOCUMENTS

EP         1 374 985 A1    1/2004
FR         2 579 573 A1   10/1986
WO     WO 2005/053833 A1  6/2005

OTHER PUBLICATIONS

European Search Report issued Apr. 16, 2014 in European Application 13306506, filed on Nov. 4, 2013.

*Primary Examiner* — Jason K Niesz
(74) *Attorney, Agent, or Firm* — Oblon, McClelland, Maier & Neustadt, L.L.P.

(57) ABSTRACT

The present invention concerns a process for loading particulate material (7) into at least one narrow vertical container (1,1') having an opening to the outside in its bottom part, which comprises inducing an upflow of air through said container, and loading said particulate material into the container from the upper part thereof in such a way that said particulate material falls downwardly counter currently to said upflow of air.
According to the invention, no physical device or air-supplying conduit is present inside the inner section of the container (1,1') to be filled when the particulate material is loaded, and said upflowing air is sourced from the bottom opening of the container and is induced by sucking air from the upper part of the container using a vacuum system.
The invention allows for the precise control of the impact velocity of the particulate material (7) as it arrives in the bottom of the container (1, 1').

14 Claims, 2 Drawing Sheets

PROCESS FOR LOADING PARTICULATE MATERIAL INTO A NARROW VERTICAL CONTAINER

The present invention relates to a process for loading particulate material into one or more narrow vertical container(s).

The process of the present invention is particularly suitable for loading catalyst particles into vertically orientated reactor tubes, such as those found in hydrogen production units.

Several refinery and petrochemical processes require that their catalyst inventories be contained inside a multitude of relatively small diameter tubes, rather than as a single bed in a large reactor vessel. This arrangement is typically imposed by the specific reaction kinetics and heat exchange requirements for a particular service, and results in a reactor configuration where many vertically orientated narrow tubes are contained within a large enclosure.

The most common of such units are reformer furnaces for the production of hydrogen, which are used extensively in both the refining and petrochemical industries. Such reformer units contain a large number (up to several hundreds) of vertical narrow tubes, enclosed in one or more cells. Each tube will have an inside diameter typically ranging from 75 mm up to 125 mm, or even larger in some applications, although a typical size is around 100 mm. The vertical tube lengths will be typically around 10 meters, although longer tubes up to around 13 meters or longer can also be used.

The catalyst particles that require to be loaded inside said tubes, are usually produced as equal-sized and identical cylindrical shapes, with various surface features and/or axial holes to increase the exposed surface to enhance both reaction and heat transfer. Said particles are typically produced from a ceramic base material, subsequently impregnated with the reactive metal components such as nickel oxide and others. Said particles vary in size and shape between different catalyst suppliers, intended service and process conditions. Their dimensional characteristics (diameter and length) are usually measured in millimeters. A typical catalyst particle can have a diameter as well as a length of around 12-16 mm, but both larger and smaller sizes can be found.

When filling an empty reactor tube with catalyst particles, there are important considerations as regards the quality and efficacy of the loading process, of which the three main ones are:

The loading process must avoid breakage of the catalyst particles. Such breakage will in particular result in increased pressure drop during operation, which affects the performances of the process.

The loading process must be as fast as practical. Extended downtime for catalyst changeout can result in very considerable financial penalties due to lost production.

When a multitude of tubes are used in the process, the loaded density of the different tubes must be homogeneous, to ensure equal pressure drop over all the tubes. This is required in order to ensure equal partition of the feed to all the tubes, which relies on symmetry to achieve equal flows and thus equal thermal and catalytic performance of all the tubes.

Achieving all these objectives poses a severe practical problem when performing a loading operation. Simply pouring the catalyst into the top of the tubes will result in each particle accelerating under the force of gravity and gaining in vertical falling velocity over the length of the tube. Taking into account the length of the tubes, this will result in an unacceptably high impact velocity in the bottom of the tube, either onto the bottom support structure in the case of an empty tube, or onto the catalyst bed surface in the case of a partially loaded tube. This problem is present for most of the length of the tube, and only gets negated once the tube is sufficiently filled so as to reduce the remaining fall height to less than about 2 meters.

The initial concept for avoiding the high velocity impact from free falling, was to lower down into the tube, by means of a cable or the like, discreet small quantities of catalyst enclosed within a container. The catalyst is only allowed to discharge from this container once it has reached the bottom. U.S. Pat. No. 3,562,998 describes such a method, using a flexible sock with a folded-over bottom opening. U.S. Pat. No. 3,778,962 describes an alternative method using a rigid container with a hinged sealing flap at the bottom opening, which is kept sealed by means of a vacuum inside the container. Once the container has reached the bottom, the vacuum inside the container is released allowing the sealing flap to fall open and discharge the catalyst.

While these methods achieved the objective of avoiding free fall of the particles, they were very inefficient with respect to both the duration of loading, as well as the homogeneity of the loaded densities.

The next concept for the loading of particulate matter into a vertical tube involved using a mechanical means for reducing the fall velocity. Under this concept, some device is inserted inside the tube, over substantially its entire length, which creates a series of typically equally spaced physical obstructions to the falling particle. The catalyst particles are poured into the top of the tube, but before they can reach a too high falling velocity, they encounter and impact onto one of the said physical obstructions. In this fashion, the falling velocity is reduced, in a stage-wise fashion, over the entire length.

Several methods, essentially only differing in the design of the obstructing device, have been described using this concept, for example patents U.S. Pat. Nos. 3,608,751,4, 077,530, EP 0548 999 and CA 2 534 865.

While these methods represent a significant improvement over the previously used containerised methods, notably with respect to loading quality and speed, they still have significant inherent drawbacks. Firstly, a mechanical device has to be inserted into the tube, and then be retracted as the loading operation progresses. Secondly, the retraction speed of said mechanical device must closely match the rate at which the level of the loaded catalyst inventory rises inside the tube. Any variance between these two speeds will result in either the bottom of the device being caught and embedded within the catalyst layer, or the bottom of the device progressively moving further away from the impact surface, creating a too high free fall distance.

A third drawback is that the catalyst particles have to physically impact onto the obstructions of the device in order to be decelerated, with the potential of damage to the device and gradual attrition of the catalyst particles.

Semi-automated versions of devices using this concept are described in patents U.S. Pat. No. 7,309,201 and EP 2 191 889. By virtue of reducing the extent of manual control of the loading process, these devices achieve more homogenous loaded densities, but still suffer from the same drawbacks with respect to the interaction between the catalyst particles and the decelerating device, both with respect to the potential for breakage, and the requirement of matching the retraction speed to the loading rate.

The most recent concept to be used to avoid high falling velocities, is to induce a counter current upwards flow of a gas, usually air, inside the tube. The falling particles thus encounter this upflowing gas stream, which exerts on the particles a resistive force called aerodynamic drag, thereby slowing them down to a suitably low falling velocity to avoid breakage upon impact onto the catalyst layer surface. To implement this concept, it is required to find a method of supplying the gas to the bottom of the tube, or otherwise create the upflow of gas.

A fortuitous side benefit of the concept of using a counter current of gas concerns the effect on any dust or smaller pieces of broken catalyst that may be present in the bulk catalyst as delivered from the supplier. These smaller broken pieces and the dust will have a much reduced terminal velocity, below that of the upflow velocity of the air, and as such it will not be able to fall down into the tube but will be transported up and out of the container and thus will not be present in the bed. Such dust and broken pieces have a detrimental effect on the performance of the bed of catalyst.

The first attempt to use this concept was described in patent GB 1 081 873, but it was impractical for use in existing plants because it required the permanent installation, during the initial construction of the reactor, of a fixed tube down the centre of the tube, to serve as the conduit for supplying the air to the bottom of the tube.

To avoid the need for the installation of such a permanent air supply tube, subsequent processes focussed on using a temporary air supply conduit which is installed before the start of the loading process, and retracted as the loading operation progresses, in much the same manner as the previous generation mechanical devices.

Patent RU 2180265 describes a method whereby the conduit to supply the air to the bottom of the tube is a flexible hose or similar, which is lowered down into the tube at the start of the loading process, and then gradually withdrawn as the tube is filled. Compressed air is blown into the bottom of the tube via this flexible hose, and escapes from the tube via the annular area between the tube wall and the hose, thus creating the required upwards air flow in said annular area. The nature and size of the equipment used, notably the retrieval drum for retracting and storing the flexible hose, makes this method impractical for use on most units, because working space at the top of the tubes is typically very restricted. It also has two technical drawbacks: it requires very careful control, without any reliable method of monitoring, to keep the retrieval rate of the flexible hose matching with the rate at which the tube is being filled. Also, the presence of the hose along the centreline of the tube reduces the cross-sectional free flow diameter of the tube to be loaded by more than half, thus increasing the tendency to create blockages in the annular area during the loading process. In order to reduce the risk of such blockages, the loading rate needs to be reduced to less than 50% of what would be possible without such reduction in diameter. This device also creates significant health risk for the personnel operating it, because the escaping air at the top of tube carries with it a cloud of carcinogenic dust from the catalyst being loaded.

The method described in patent RU 2180265 suffers from an additional constraint in that the bottom tip of the air supply conduit requires to be maintained some distance, typically 500 to 1000 mm, above the surface of the catalyst bed, to avoid it becoming trapped in the bed as the loaded level rises. Since the air flow exits the conduit at its bottom end and then immediately moves up in the annular area, there exists a stagnant volume between the bottom tip of the conduit and the surface of the bed where there is no upwards air flow, and thus no further effect on the falling catalyst particles.

The present invention aims at providing an improved process, which allows the loading of particulate material into a narrow vertical vessel or container, and overcomes the drawbacks of the processes of the prior art.

The present invention therefore concerns a process for loading particulate material into at least one narrow vertical container having an opening to the outside in its bottom part, which comprises inducing an upflow of air through said container, and loading said particulate material into the container from the upper part thereof in such a way that said particulate material falls downwardly counter currently to said upflow of air, characterized in that no physical device or air-supplying conduit is present inside the inner section of the container to be filled when the particulate material is loaded, and said upflowing air is sourced from the bottom opening of the container and is induced by sucking air from the upper part of the container using a vacuum system.

According to the invention, an ascendant flow of air is created from the bottom to the top of the inner part of the container that needs to be filled with the particulate material, which slows down the falling particles to a velocity that is low enough to avoid any breakage thereof at the moment of impact at the bottom of the container or at the catalyst surface for a partially loaded container.

According to the invention, the upflowing air is sourced from the bottom opening of the container. Such opening is typically a support grid onto which the catalyst bed is loaded. When the container becomes progressively loaded, the upflowing air enters the container via such bottom opening, and flow up through the already loaded part of the catalyst bed.

By regulating the velocity of the upflow of air, the drag force on the falling particles can be controlled right up to the point of impact onto the support grid at the bottom of the container or the catalyst surface for a partially loaded container, without any stagnant volume above the impact point. Under these conditions the particles' net downwards velocity relative to the container, and thus the impact velocity can be controlled over the entire length of the tube. This results in very accurate control to achieve a homogeneous loaded density over the length of an individual tube as well as between different tubes, and thus achieve the desirable homogenous pressure drop over all tubes.

In opposition to the techniques used in the prior art, in the present invention no mechanical device is introduced into the container during the loading operations, neither for physically slowing down the falling particles nor for supplying air into the vessel nor for any other purpose such as controlling the loading level. The present invention thus allows overcoming another drawback of the processes disclosed in the prior art.

In particular, the absence of any physical device inside the container avoids the risk of blockage during loading, which is present in the prior art due to the reduced cross-sectional diameter. Thus, the present invention allows for a significantly increased loading rate, with a corresponding reduction in the overall loading duration.

Furthermore, in the present invention the upflow of air is present right up to the point of impact onto the catalyst bed, without any stagnant volume immediately above the bed. This has a significant benefit over the devices used in the prior art, because the present invention with the air flowing through the bed will remove any dust or small pieces, typically referred to as chips, that are created during the impact. This removal of dust and chips from the loaded bed will result in a decreased pressure drop across the bed, which is beneficial for the performances of the process. The presence of the stagnant volume for the devices used in the prior art means that said devices can only remove dust and broken pieces that may be present in the catalyst as delivered, but not the dust and chips created during impact.

According to the invention, the impact velocity of the particles is advantageously controlled at a value that avoids breakage thereof.

According to a preferred embodiment, the impact velocity of the particles remains at a mean value that ranges from 1 m/s to 10 m/s, preferably from 3 m/s to 8 m/s, and even more preferably from 4 m/s to 6 m/s.

Preferably, the mean impact velocity is controlled to remain at a constant value during the whole loading operation, that is, over the entire length of the tube, to ensure a homogenous loaded density.

The value of the impact velocity of a falling particle is the value of the falling velocity achieved by said particle when it reaches either the bottom of the container or the bed of particles already loaded. The velocity hereabove is expressed relative to the container (and not relative to the upflow of air).

The impact velocity of the particles is controlled by controlling the upflow velocity of the air. This upflow velocity control is achieved by controlling the flow of air exiting the container through suitable devices such as valves.

Preferably, the air is sucked from the top of the container, which means that a vacuuming system is connected to the top exit of the container.

In order to establish an upflow of air in the container, the bottom part thereof needs to have an air entrance such as a process connection point, as is typically present in all commercial tubular reactors. Such opening is typically covered with a support grid onto which the particulate material is loaded.

To obtain the required impact velocity, the required upflow rate of air must be calculated. It depends in particular on the dimensions of the container, specifically the inside diameter; the aerodynamic characteristics of the particles; the conditions of the upflowing air, specifically the pressure and temperature; and the remaining fall height after accounting for the amount of particles already loaded.

As the loading of the container progresses, two parameters in particular will change. Firstly, as the bed height increases, the remaining fall height decreases. Secondly, as the bed height increases, the pressure drop across it also increases for the air that flows in from the bottom opening. As a result, the pressure inside the container will decrease, resulting in a decrease of the air density. This will require that the upflow rate of air must be controlled and adapted over time and on a continuous basis, as the filling of the container progresses, in order to keep the impact velocity of the particles at the target value.

The upflow of air is controlled by controlling the amount of air that is allowed to flow to the vacuum system.

This precise control of the impact velocity of the particles during the loading has several advantages. As explained above, it prevents breakage of the particles. It further allows achieving an improved homogeneity of the density of the bed of particulate material all along the length of the container.

In the case of loading of a reactor, it allows to precisely control the overall loaded density of the bed of catalyst particles, and therefore the pressure drop across such bed.

Finally, in the case of a process using a plurality of catalyst containers such as tubes in parallel, it allows achieving an identical bed loaded density in all the tubes, and thus a similar pressure drop across all tubes, which is particularly important as it ensures equal partition of the feed stream to all the tubes, to achieve equal flows in all tubes and thus equal thermal and catalytic performance of all the tubes.

The system used for loading the particulate material at the top of the container can be any conventional one, provided it allows to control and monitor the flow rate of particles supplied to the container.

According to a preferred embodiment of the invention, the amount of particles supplied to the container over time is controlled and measured in a very precise manner, by using a catalyst flow measurement device. Such a device can be based for example on interrupted light, radar, induction or any suitable technology.

Using such a system of counting the particles allows achieving an even more precise control of the impact velocity of said particles, as it allows during the loading operations to calculate accurately over time the height of the bed of particles already loaded in the container, and thus the remaining fall height from the top inlet.

The process of the present invention can be used in all technical fields, in all cases in which at least one vertical narrow container or vessel of relatively long size needs to be filled with particles of a material that is likely to be broken due to impact on a hard surface under conditions of gravitational free fall.

By "narrow", it is meant a container such as a reactor tube having an internal diameter of at most 300 mm, preferably less than 200 mm, and more preferably ranging from 50 mm to 150 mm.

Preferably, the container has a cylindrical shape, such a tube.

It has typically a height ranging from 5 to 15 m.

The process is particularly suitable for loading catalyst particles into one or several narrow reactor tube(s), in particular in the fields of (petro) chemistry and petroleum refining.

Hence, according to a preferred embodiment, the particulate material comprises catalyst particles, and said at least one container consists of one or more narrow vertical reactor tube(s) used in a chemical, petrochemical or petroleum refining process.

According to a particularly preferred embodiment, said at least one container consists of a plurality of vertical reactor tubes encased in a fired furnace cabin, which is consistent with a typical steam/gas reformer furnace used for the production of hydrogen.

The invention will now be further illustrated in a non limitative embodiment, with reference to the accompanying drawings, in which:

FIG. 1 shows a vertical narrow reactor tube 1, which is connected via conduit 2 to a vacuum system of suitable power not shown.

Figure 1:
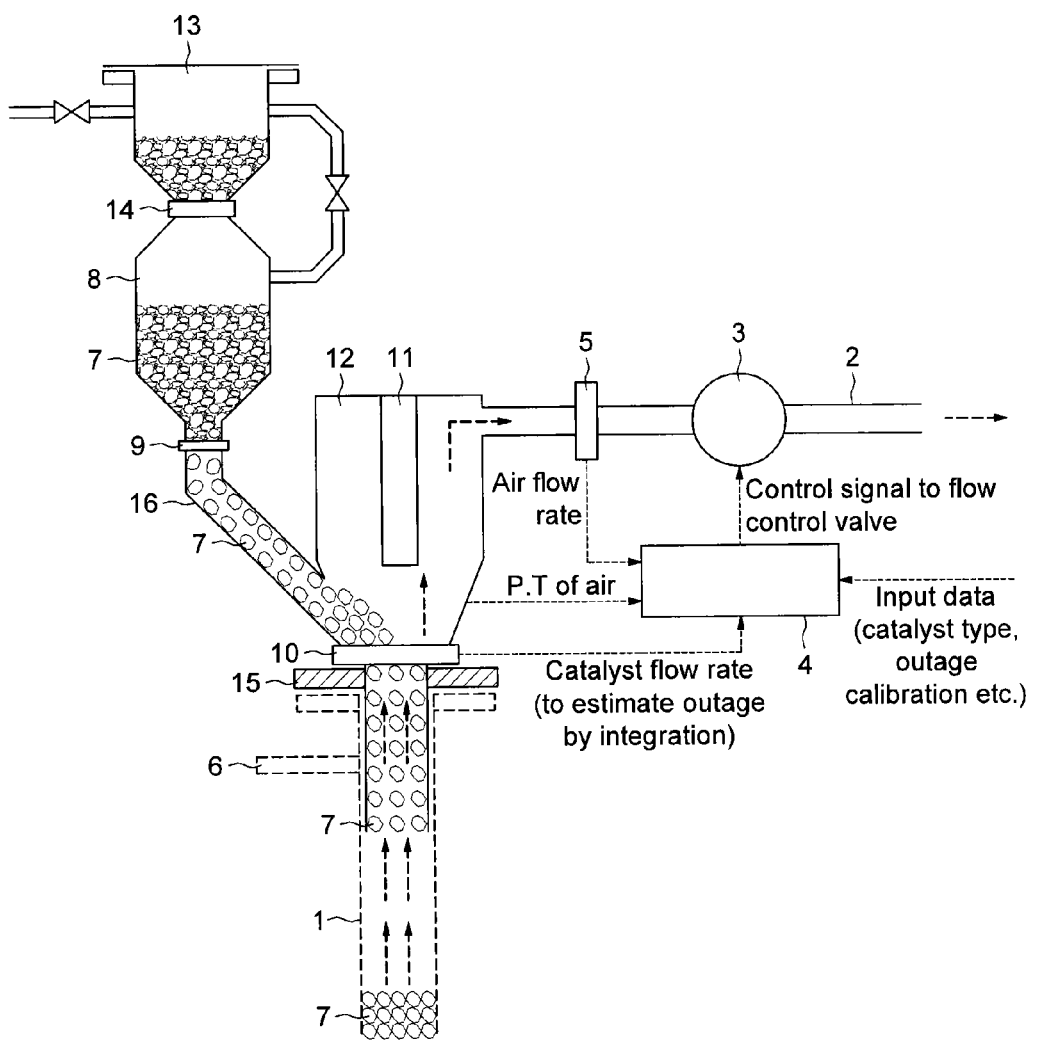
FIG. 1 illustrates a preferred example of implementation of the process of the invention, in the case of loading catalyst particles into a narrow vertical container such as a reformer tube.

The vacuum system sucks air from the top of reactor tube 1, thereby creating an ascendant flow of air from the bottom to the top of reactor tube 1, which is shown by the bold dotted arrows.

In a manner known per se, the bottom part of the reactor tube 1 is open to atmosphere via a manifold, with a catalyst support grid not shown, which allows air to enter at the bottom of the reactor tube, and flow from the bottom to the top of the reactor tube.

The air flow rate is adjusted using air flow control valve 3, which is controlled by process control computer system 4.

The required air flow is calculated by process computer system 4 based in particular on:
  a) The shape and sizes of the reactor tube 1, in particular the diameter;
  b) The aerodynamic characteristics of the type of catalyst being loaded;
  c) The conditions of the upflow of air—the pressure and temperature of the upflowing air will affect its density, and thus the drag that it will impose on the falling particles;
  d) The remaining fall height—as the tube is filled, the fall height will decrease, and less drag will be required for the particles to impact with a constant velocity;
  e) The impact velocity required.

An air flow measurement system 5 such as a flow meter, allows monitoring of the effective air flow rate exiting the reactor, and communicates this information to control computer system 4.

Some tubular reactor designs have a side inlet line 6 such a feed inlet, which will require to be plugged to ensure that all the air flow is coming up through the reformer reactor tube 1 itself.

The catalyst particles 7, to be loaded into the reactor tube 1 are fed from the catalyst supply hopper 8, through a catalyst flow control device 9 and then via conduit 16.

The catalyst flow control device 9 can be set manually or can be controlled by computer system 4, to give the appropriate supply rate of catalyst.

A catalyst flow measurement device 10, based for example on interrupted light, radar, induction or any suitable technology, is situated just above the point where the catalyst is introduced into reactor tube 1.

This flow device 10 passes the signal to the process control computer 4 to integrate over time the amount of catalyst loaded, to allow the computer 4 to calculate the height of the loaded bed, and thus the remaining fall height. This calculation depends on a calibration coefficient relating the number of catalyst particles to vertical loaded height, which must be manually entered into the computer before the loading is started. The calibration coefficient can be perfectly accurate, or not. When the coefficient is not perfectly accurate, it can in particular be moderated each time the outage is measured by a more accurate means such as an electronic outage measurement 11 or a physical measurement by means of dip tape as described below.

An electronic outage measurement device 11, based on laser, radar or ultrasound, can be installed in the top of the catalyst loading system, and is used periodically to check the outage. Preferentially, the catalyst flow is interrupted briefly to allow the measurement. Due to the continuous extraction of air, the empty space above the bed of loaded catalyst particles 7 at the bottom of the reactor tube will be largely free of dust, which will facilitate the use of a distance measurement device.

In addition, a sealed handhole 12 can be provided to allow a traditional dip tape to be dropped in for a physical check of the outage. The air flow must be interrupted for this type of measurement.

When it is necessary to add more catalyst to the catalyst supply hopper 8, it can be advantageously added via the catalyst make-up hopper 13, through transfer slide valve 14.

During the loading operation, the catalyst supply hopper 8 must be properly sealed, as in the configuration disclosed in FIG. 1 all the loading system operates under vacuum. Transfer slide valve 14 if any must then be closed.

The whole loading system is properly sealed onto reactor tube 1, using means 15.

Using the device disclosed in FIG. 1, the catalyst particles 7 are loaded into reactor tube 1 counter currently to a controlled upflow of air induced by vacuum and monitored by computer system 4.

Figure 2:
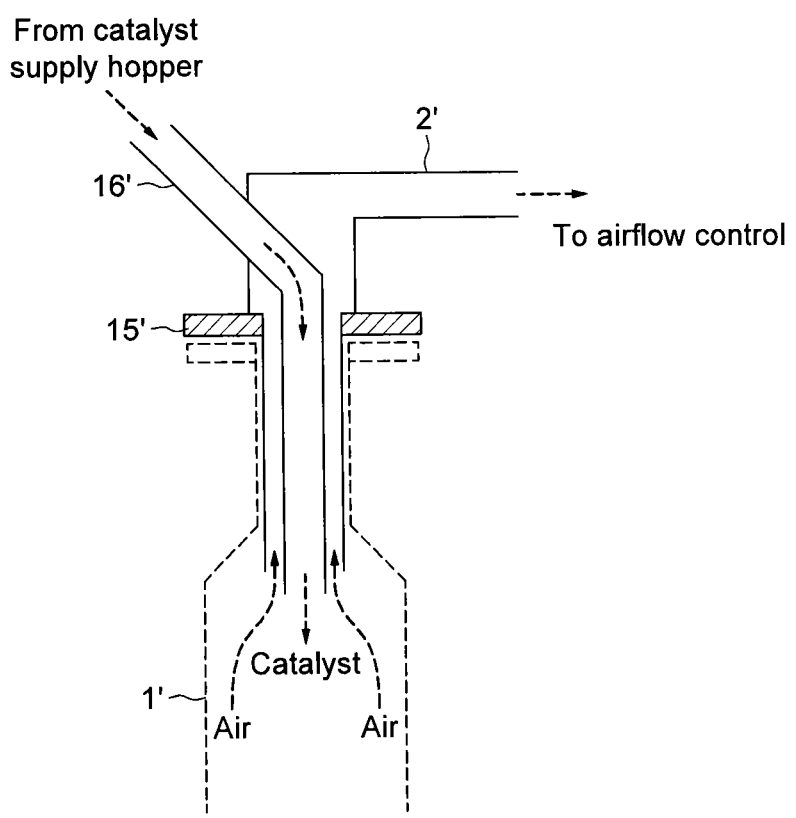
FIG. 2 illustrates another preferred example of implementation, in the case in which the main portion of the tube has a larger diameter than the top inlet part thereof.

FIG. 2 shows the implementation of the invention in a vertical reactor tube 1' which has a design where the main tube containing the catalyst has a larger diameter than the top inlet section. The device as described earlier cannot be used for the loading of such a reactor, because in order to have a suitable upwards air velocity in the main tube section, the velocity through the narrower top section will be too high to allow the catalyst particles to flow down this section.

The system of the invention can be adapted to accommodate these types of tubes, by displacing the entry point of the air to below the narrower top section. This can be done by having a double-pipe arrangement as shown in FIG. 2, with catalyst flowing down the inside of the inner pipe made by conduit 16', and air flowing up in the annular space between conduit 16' and the narrower top section of the reactor 1'.

In this configuration, there is no air flow in conduit 16'. The catalyst falls through conduit 16' only under the influence of gravity, and will experience the upwards drag of upflowing air only once it enters the wider section of the reactor 1'.

The corresponding configuration is illustrated in FIG. 2, in which only the changed section with regard to FIG. 1 is shown, the air flow control and catalyst supply sections (similar to those of FIG. 1) being omitted.

Of course, the process of the present invention can be implemented in narrow vertical containers of all types and configurations, and one skilled in the art can easily accommodate the particular device arrangement needed to accommodate all types of particular configurations.

The invention claimed is:

1. A process for loading particulate material into at least one narrow vertical container having an opening to the outside in its bottom part, wherein said process comprises inducing an upflow of air through said container, and loading said particulate material into the container from the upper part thereof in such a way that said particulate material falls downwardly counter currently to said upflow of air, wherein no physical device or air-supplying conduit is present inside the inner section of the container to be filled when the particulate material is loaded, and said upflowing air is sourced from the bottom opening of the container and is induced by sucking air from the upper part of the container using a vacuum system.

2. The process of claim 1, wherein the air is sucked from the top of the container, using a vacuum system which is connected to the top exit of the container.

3. The process according to claim 1, wherein the upflow of air induced through the container during the loading of the particulate material is controlled during the whole loading operation, to keep the impact velocity of the particles constant.

4. The process according to claim 1, wherein the upflow of air induced through the container during the loading of the particulate material is controlled during the whole loading operation, to keep the impact velocity of the particles at a mean value that ranges from 1 m/s to 10 m/s.

5. The process according to claim 1, wherein the amount of particles supplied to the container over time is controlled and measured in a precise manner, by using a catalyst flow measurement device.

6. The process according to claim 1, wherein the container has a cylindrical shape.

7. The process according to claim 1, wherein the container has an internal diameter of at most 300 mm.

8. The process according to claim 1, wherein the container has a height ranging from 5 to 15 m.

9. The process according to claim 1, wherein the particulate material comprises catalyst particles, and said at least one container consists of one or more narrow vertical reactor tube(s) used in a chemical, petrochemical or petroleum refining process.

10. The process according to claim 1, wherein said at least one container comprises a plurality of vertical reactor tubes in a stream/gas reformer furnace, for the production of hydrogen.

11. The process of claim 4, wherein said mean value ranges from 3 m/s to 8 m/s.

12. The process of claim 4, wherein said mean value ranges from 4 m/s to 6 m/s.

13. The process of claim 7, wherein said internal diameter is less than 200 mm.

14. The process of claim 7, wherein said internal diameter ranges from 50 mm to 150 mm.

* * * * *